INVENTOR.
Roy E. Uptegraff, Jr.
BY
HIS ATTORNEYS

May 6, 1969 R. E. UPTEGRAFF, JR 3,443,157
DIRECT BURIAL TRANSFORMER
Filed Dec. 29, 1967 Sheet 4 of 4

INVENTOR.
Roy E. Uptegraff, Jr.
BY Green, McCallister & Miller
HIS ATTORNEYS

United States Patent Office 3,443,157
Patented May 6, 1969

3,443,157
DIRECT BURIAL TRANSFORMER
Roy E. Uptegraff, Jr., Scottdale, Pa., assignor to R. E. Uptegraff Manufacturing Company, Scottdale, Pa., a corporation of Pennsylvania
Continuation-in-part of application Ser. No. 492,748, Oct. 4, 1965. This application Dec. 29, 1967, Ser. No. 707,342
Int. Cl. H02h 7/04, 7/14
U.S. Cl. 317—15           23 Claims

ABSTRACT OF THE DISCLOSURE

An electrical transformer construction is provided for direct to ground heat dissipation. The wall of its pot or housing defines a lower convection chamber for containing the transformer winding and auxiliary equipment, and defines an upper chamber for suitable control means that is sealed-off from a convection fluid used in the lower chamber. The transformer is of a wall construction and elongated design such that it eliminates the necessity for the use of air currents and permits the pot or housing to be fully buried in the ground with its wall in a direct heat transfer relation with the earth or ground.

---

This application is a continuation-in-part of my co-pending application Ser. No. 492,748, now abandoned, of the same title and filed on Oct. 4, 1965.

This invention relates to electrical distribution transformers and particularly to step-down transformers, such as used for small business and residential distribution systems.

Heretofore there have been a number of methods of mounting transformers, such as employed for reducing a main line distribution voltage down to a lower utilization voltage at individual commercial and domestic installations. The oldest and more common method involves the placing or securing of the transformer adjacent the top portion of a pole. Later installations have involved placing the transformer within the pole as, for example, within its base, or placing the transformer on a pad or service pedestal flush with the ground. The recent trend has been to install transformers in an underground mounting (URD type) using a cement or other type of vault. Those skilled in the art have customarily employed air movement for cooling transformers, such as those placed in a pole base or underground. This has presented problems, particularly in connection with an underground mounting.

In an underground vault type of installation, there is provided a hole in the ground with a much larger diameter than the transformer unit to be contained therein. This vault is provided at the top with some form of air introducing and venting means, such as a ventilating grill, for providing air circulation; also means is provided at the bottom for giving some underground drainage, as by placing the transformer unit on a gravel or crushed rock bed.

In a transformer unit employed for underground vault mounting, it has been found that the heated air tends to move upwardly along the spacing between the transformer tank, housing, pot or casing and the metal or concrete vault to thus set up a vacuum effect towards the lower portion of the tank. This, with the absence of circulating air underneath the tank, has led to relative inefficient convection removal of heat generated during the operation of the transformer, particularly during periods of peak loads; and an endeavor has been made to meet this problem by providing the housing with ribbing and with some means, such as baffles, for directing incoming cold air in a counter current flow downwardly, during the upward movement of the heated air, in such a manner as to produce a so-called chimney effect.

It will be apparent that an underground vault-mounted transformer installation, although advantageous from the aesthetic standpoint, has been much more expensive than, for example, an overhead pole mounting. However, a pole mounting, in addition to being unsightly in our metropolitan and suburban areas, exposes the transformer unit and its connecting cables to windstorms, lightning and the like. On the other hand, conventional underground vault installations require a protective overhead grating which will permit the desired circulation of air. They thus permit surface water and dirt to enter the vault and necessitate frequent cleaning-out operations.

Summarized briefly, it is well recognized that an underground installation is advantageous from the standpoint of protecting the transformer from vehicular collision, lightning, ice and windstorms, animals, hunters, vandalism, etc., in addition to preserving the aesthetic nature of the surroundings. However, full use of such a type of installation has been offset by its disadvantageous features, namely its high cost of initial installation, the factor of maintenance, the danger of peak load overheating, etc. My invention has thus been devised to provide a direct burial type of installation which will meet the factors heretofore limiting such a type of utilization and which will have further advantageous features that will make it suitable for full adoption by those skilled in the art.

It has thus been an object of my invention to solve the problem involved in an underground transformer installation, particularly from the standpoint of transformer units, such as may be used to step-down line voltage for use in a building or home;

Another object has been to provide an installation whose tank can be completely enclosed and hidden and, if desired, fully covered with sod without the necessity for the use of screening shrubbery, etc.;

Another object has been to discover the factors involved in the problem and to meet the principal or important factors which enter into the problem;

A further object has been to provide a transformer unit which will effectively and efficiently utilize a new principle of heat dissipation and will eliminate the necessity for the use of air currents;

A still further object of my invention has been to devise a transformer that will effectively accomplish its heat transference directly to and through the ground and in the absence of an intervening agency;

These and other objects of my invention will appear to those skilled in the art from the illustrated embodiment thereof in which.

And, FIGURES 10 to 12, inclusive, are graphs or diagrams illustrating comparative characteristics of a transformer unit of my invention with respect to a conventional air-cooled type.

I have determined from a study of all the factors involved that the key or crux to the problem heretofore encountered in an underground installation, points to the necessity for cooling the transformer unit and the difficulties encountered from the accepted type of cooling means. I discovered that I could successfully provide a transformer unit that may and should be directly, as to its outer tank, housing, casing, container or pot, installed in contact with the earth or soil. Through such a direct contact, I provide not only an effective type of heat removal, but one which is more efficient and foolproof than the conventional air-cooled type. In carrying out my invention, I employ a transformer having its associated parts enclosed in a sealed-off convection compartment which carries the transformer and which has a suitable convection flow fluid or dielectric, such as mineral oil.

I determined that although the soil, earth or ground is a relatively poor heat-conducting medium that, under proper conditions, it can be effectively employed to remove the heat generated in a transformer unit and is not only practical, but actually more effective than an air circulating medium. In this connection, I determined that the transformer should have a lower transformer-containing chamber or compartment fully enclosed in a tank, pot or container housing that seals it from the atmosphere. This chamber is to be buried within a hole directly adjacent or in abutment with the ground, preferably at its substantially constant moisture level. If the tank wall is of metal, it may be provided with protective insulating coating of from a maximum of ⅛ of an inch to an optimum of about ¹⁄₁₆ of an inch without adversely affecting its heat transferring properties. That is, I discovered that an insulating protective coating could be used, such as of resin impregnated fiberglass with a resin film for protecting the fiberglass, or some other suitable type of coating, provided that the coating has a heat transferring (conducting) capability at least substantially equal to that of the surrounding ground or earth.

For best results, the sealed, heat-transfer chamber should be located below the frost line, particularly in the northern climates and, when positioned in a constant moisture area of about three feet or more below the ground surface, attains a mean temperature during utilization of about 65° to 75° C. while the ground has a relatively low constant temperature of about 15° to 20° C.

In accordance with my concept, I employ a relatively vertically elongated type of transformer housing, tank, casing, shell or container having a proportionately greater length than diameter, as compared to conventional transformer units. The tank or container, at its lower extremities, defines an enclosing lower chamber A for the transformer and other associated parts in a suitable convection flow bath or fluid, such as of oil. It has an upper, sealed-off air chamber B through which control means extends into the lower, heat-generating, transformer chamber. The upper sealed-off or superimposed chamber B thus serves not only to facilitate operation of switches and a circuit breaker, replacement of fuses, etc., in the lower chamber A, but also serves as an effective spacer from the ground level to assure the proper depth of the lower chamber. Further, I have found that it is advantageous to slightly taper the pot from a top diameter to a bottom diameter, such that a slightly larger area is provided adjacent the top portion of the lower chamber and thus, in the area which is normally subjected to the highest temperature. The hole bored by a 24, 36, 48 inch or a smaller augur should be of a larger diameter by at least about two or three inches than the maximum diameter of the tank or pot, so that dirt can be effectively tamped down and about a full extent of the pot and particularly, about the side wall portions thereof that surround the lower chamber.

Heretofore, investigators in this particular or direct burial field have proceeded on the wrong premise, namely that the approach was to provide some high thermal insulating type of encapulant separating and protecting the active component from the ground. One investigator conceived the idea of placing an outer enclosure in a spaced relation about the transformer tank or enclosure, and of filling such dead space with an insulating oil. Such a type of arrangement involving an overall enlargement of the diameter of the unit, tended to produce an outer stagnant oil area, did not prove to be practical or successful and, for this reason, those skilled in the art have heretofore thought that it was impossible to design or construct a transformer unit which could successfully utilize the surrounding ground to take care of the heat generated and, for this reason, have concentrated their efforts on improving the convection transfer of heat by the movement of air currents.

My investigations have disclosed that the reason the previous approach to ground heat dissipation failed was due to the fact that previous investigators did not realize that the tank, pot or housing which contains the transformer should, itself, be in direct contact with the ground, and that an insulating or space barrier only tends to retain the heat within the immediate area of the transformer and thus has the tendency of causing it to burn out. In other words, I discovered that there must not be any barrier, insulating or heat conduction restraining means in or between the wall of the pot or housing for the transformer which has a lower heat transferring capability than the surrounding ground, itself. That is, any interposed agency should have a heat conductivity as a minimum substantially equal to that of the surrounding ground. In this connection, I discovered that it was practical to use a suitable protective coating about the outer wall portions of a metal pot or container, provided that such a coating has a conductivity at least equal to the conductivity of the surrounding ground or is sufficiently thin as to contribute a negligible additional amount of temperature rise to the transformer unit. Any agency in or interposed between the wall of the pot or casing within which the transformer is housed must not serve as an insulating means in the sense of causing an appreciable obstruction or barrier to the flow of heat and should preferably, on the other hand, have a conductivity at least substantially equal to the conductivity of the surrounding ground or soil within which the housing or tank is tamped or positioned. This proved to be an important factor in solving the problem.

I have additionally determined that the tank, pot or container housing wall of the transformer may, for example, be entirely of a resin impregnated fiberglass construction. There will be no difference in performance characteristics of a transformer having a tank, with, for example, a ⅛ of an inch thickness of steel wall and a ⅛ of an inch outer coating thickness of resin impregnated fiberglass, as compared to a tank whose wall thickness is entirely of resin impregnated fiberglass, for example using a polyester resin. The thermal conductivity of a wall of a full thickness of material such as a polyester impregnated fiberglass, is about twice as great as the earth itself; it is .07 watt per square inch, degree C. per inch as compared to about .03 for the earth. Investigating further, it has been determined that a transformer having, for example, a tank wall of about ⅛ of an inch thickness of steel with ⅛ of an inch thickness of a glass polyester outer coating will have a temperature difference between the inside and outside of about 1.9° C. per watt of heat dissipation. If the steel wall portion is eliminated to provide a fully glass polyester wall construction, the temperature difference is reduced about ²⁄₁₀ of a degree C. to about 1.7° C.

I discovered that there was a second important factor which had to be met. In this connection, it was determined that the tank, shell, container, casing or housing should have a diameter compatible with the size of the transformer core and coil assembly contained therein and have a sufficient length to provide a large surface area for emitting heat to the surrounding earth. This results in a greater length to diameter ratio than applies to conventional transformer units, above smaller sizes, e.g., above a rating of about 5 kva. (see FIGURE 10 of the drawings). There appears to be no maximum limitation on the ratio, except as may be involved in digging or drilling a hole in the earth, in that I have successfully employed ratios of oil depth to diameter in chamber A of up to about 10 to 1. I have found that there is no stagnant oil area, even with the higher ratios.

Briefly, in carrying out my invention, I utilize what may be termed an elongated pot, tank or container that has a lower convection compartment A within which the transformer is positioned in a transversely-central and in a spaced relation adjacent its bottom end, also within which auxiliary equipment, such as switches, circuit breakers, fuses, etc. are positioned. This lower chamber A is elongated from the standpoint of its diameter and contains a convection fluid, such as mineral oil, in a sealed-off relation therein for convection movement between its top and bottom portions during the operation of the unit, in order to pick-up the heat generated in the immediate area of the transformer and distribute it substantially uniformly throughout the chamber, with a minimized heat gradient between the top and bottom portions and, at the same time, transfer such heat at greatly reduced temperatures along the full length of the side walls as well as the bottom wall of the chamber to thus impart it to the enclosure wall which defines such chamber.

The heat, as thus imparted to the walls of the transformer chamber, is then conducted directly to the ground in direct transverse or radial paths from the walls to dissipate the heat fully within the surrounding ground area. Also, preferably in accordance with my invention, auxiliary equipment, such as switches, terminal blocks, fuses, etc., are contained in the same convection chamber as the transformer, such that the transformer and its auxiliary equipment are all maintained at substantially the same operating temperature. Also, preferably in accordance with my invention, a sealed-off control chamber B is superimposed above and maintained in a sealed-off relationship with the lower transformer chamber A and is provided with means for obtaining maintenance access to the lower chamber as well as means for setting and re-setting a circuit breaker and switches. The upper chamber is, itself, normally sealed-off from the atmosphere and may represent a dead air spacing above the lower chamber. Tamperproof means is provided for an authorized workman to gain access to the upper chamber B when it is necessary.

As a result of this construction, the transformer tank or pot which contains both chambers may be shaped to assure the meeting of the important factors relating to the solution to the problem and, at the same time, to facilitate the insertion and removal of the unit from a ground or augur hole and permit a complete ground coverage of the unit. The latter feature gives maximum protection to the unit from the standpoint of surface agencies while, at the same time, enables it to meet maximum aesthetic requirements of any suitable location.

I have investigated the use of outside fins, but have determined that I can obtain a much better or higher heat conducting capability from a relatively smooth wall pot of a given diameter than from one provided with fins having the same outer diameter as the smooth wall pot. As to the use of a protective coating for the outer surface of the pot, I have found that ¹⁄₁₆ of an inch of fiberglass in a polyester resin (applied in liquid form) and a thin outer film of a resin in the nature of Hypalon (a DuPont product) will produce a permissible temperature rise of only about one degree C. or about 2%. The film is employed to prevent moisture penetration along the fiberglass fibers. This calculation was based on a normal condition of operation in which a temperature rise results of about 50° C. at or along the inner surface of the tank or pot walls.

It will be noted that a transformer unit of my invention has a larger outer surface area than a conventional air-cooled transformer, such that it has an increased heat conducting ability. This is accomplished by elongating the container. A transformer unit of my invention also has a greater operating life period, in that it operates at a lower mean temperature and is much slower in reaching a maximum temperature under a given power load. Due to the heat sink characteristic of the surrounding earth, the transformer unit has a thermal inertia to transient heating of about five times as great as and a lower peak temperature than a conventional, air-cooled transformer unit. Accordingly, a lower capacity transformer of my invention may be used than required for a URD mounted conventional air-cooled transformer.

Figure 2:
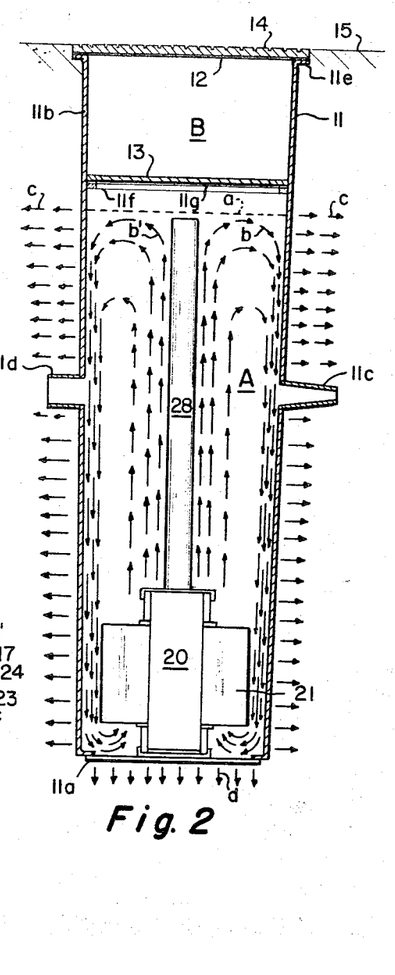
FIGURE 2 is an enlarged elevation in section through a unit of my construction with wiring and other internal parts removed, except for central posts and a transformer; it illustrates by arrows thermal flow, both within the tank of the transformer and from the tank into the surrounding soil or ground.

In FIGURE 2, I have somewhat diagrammatically illustrated the heat flow in a mounted unit of my construction having a lower, sealed-off, transformer chamber A and an upper control or access air chamber B. In this figure, $a$ represents the level of convection liquid, such as mineral oil, within the chamber A. The arrows $b$ and $b'$ illustrate the convection movement of such fluid or liquid during the operation of a transformer 20 which, as shown, is centrally-upwardly and outwardly-downwardly fully along the side wall of the pot or container. The arrows $c$ illustrate the direct radial conduction flow of the heat from the side wall of the pot through the ground, while the arrows $d$ illustrate the direct axial flow from the bottom wall of the pot through the ground. As will be appreciated, the principal, essential and primary heat flow or dissipation of heat is effected from the side wall of the unit, as indicated by the arrows $c$.

Figure 1:
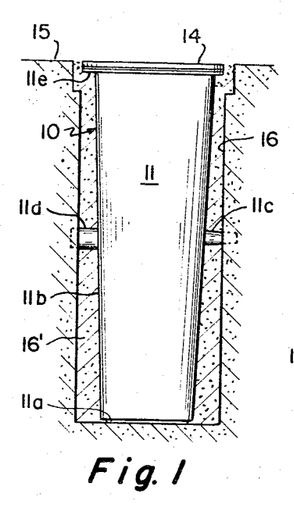
FIGURE 1 is an elevation of a transformer unit constructed in accordance with my invention showing it inserted in a substantially flush-mounted relationship within a hole in the ground.
Figure 1A:
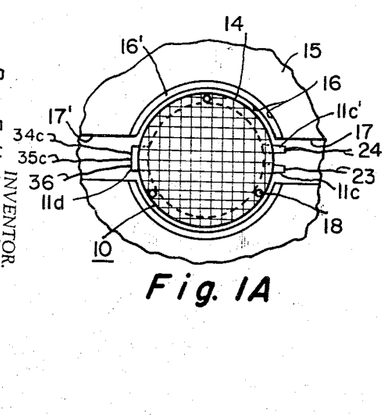
FIGURE 1A is a top plan view on the scale of FIGURE 1 of the unit of FIGURE 1 but showing but showing electric wiring or cable connections thereto.

Referring particularly to FIGURES 1, 1A and 2 of the drawings, I have shown a transformer unit 10 having a metal tank, housing, container, casing or pot 11 whose bottom wall 11a and side walls 11b define the lower transformer and convection chamber A, and whose side wall 11b and whose dividing or partition wall 13 define upper access or control chamber B. In the construction of the drawings, a pair of side-by-side positioned stress cones 11c and 11c' are shown provided for the high voltage or input leads or cables to transformer 20 and an oppositely-positioned potting or junction box 11d is shown provided for the lower voltage or output leads or cables.

Figures 8, 9, 9A:
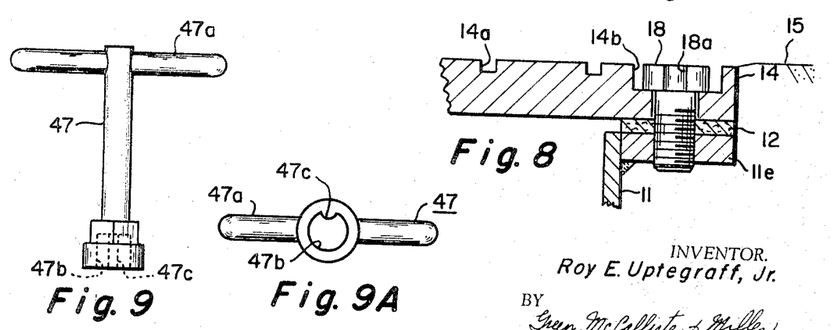
FIGURE 8 is a greatly enlarged fragmental section in elevation showing means for fastening a stop cover plate for fully enclosing the transformer unit of FIGURE 3.
FIGURE 9 is a side elevation and FIGURE 9A is a bottom plan view on the scale of FIGURES 5 to 7 showing a spanner wrench for servicing the transformer unit of FIGURE 3.

The open top portion of the side wall 11b of the container 11 has an outwardly-projecting flange or rim portion 11e for mounting and securing a cover plate 14. If, as shown in FIGURE 1, the cover plate 14 is to be positioned in alignment with the ground level 15, it is preferably provided with a knurled or skid-proof surface as, for example, accomplished by using spaced recess or groove portions 14a (see FIGURE 8). As illustrated in FIGURES 1A and 8, the cover plate 14 may be removably-secured by headed bolts 18 within threaded, circumferentially spaced-apart holes in the rim portion 11e to seal-off the compartment B from dirt and moisture. A ring sealing gasket 12 is shown positioned on the flange 11e between it and the cover plate 14.

Referring particularly to FIGURE 1, I have shown a transformer unit 10 of my construction as positioned within a vertical hole 16 as dug or augured out within the ground from its surface level. It will be noted that its side wall 11b has a sufficient spacing with respect to the ground hole 16 to permit secure tamping-down of earth fill 16' between it and the hole. The bottom end wall 11a of the container or pot 11 may rest directly on the dirt or ground bottom of the hole 16. The stress cones 11c, 11c' and potting box 11d are adapted to receive cables which may be of an underground type, as introduced through ground drill holes or trenches 17 and 17' (see FIGURE 1A). If desired, suitable plug-in connectors may be used instead of the cable lead arrangement.

Figures 3, 5A, 5B:
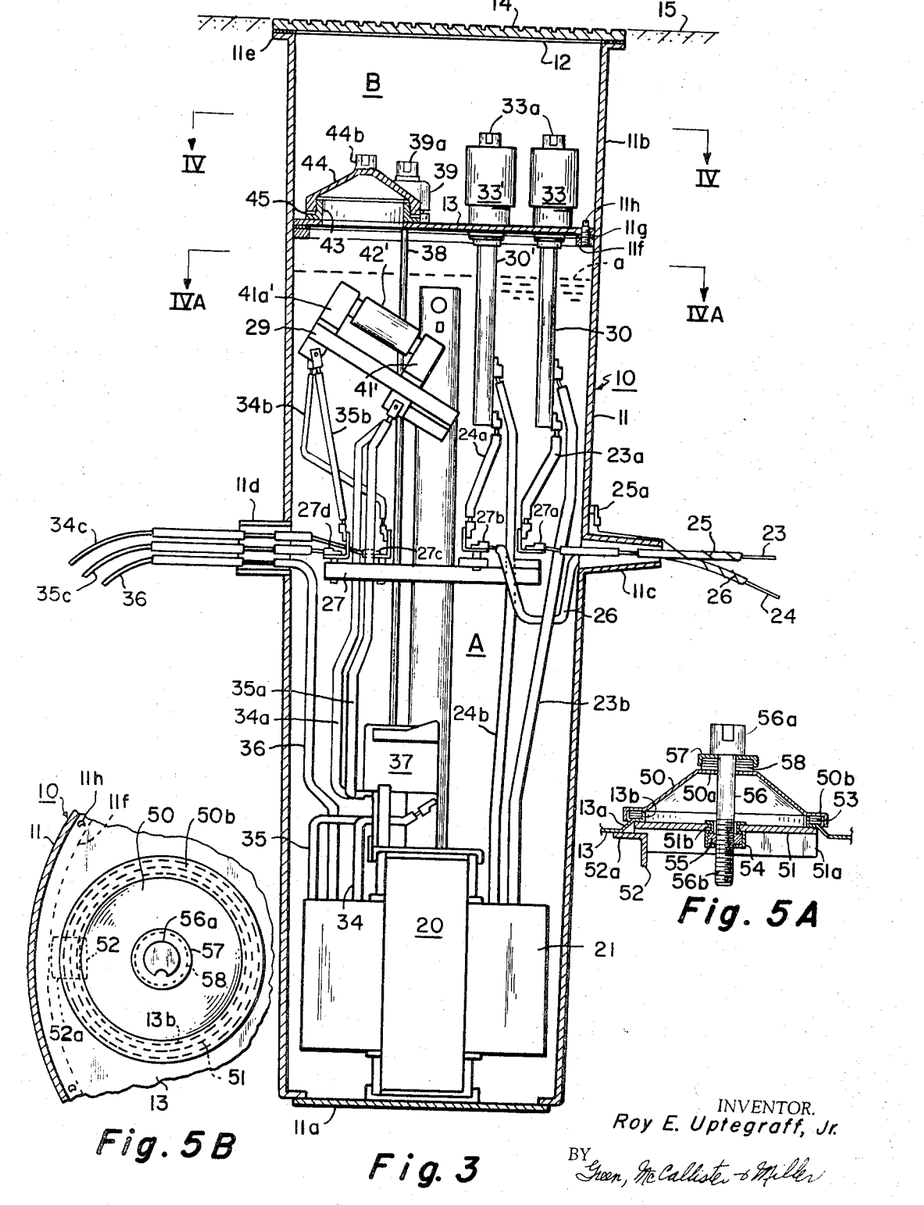
FIGURE 3 is a greatly enlarged sectional elevation through the transformer unit of FIGURES 1 and 2 showing wiring and internal collateral parts or auxiliary equipment mounted in the tank of the unit.
FIGURE 5A is a fragmental section in elevation similar to and on a slightly reduced scale with respect to FIGURE 5, showing a modified mounting and construction of an access cover.
FIGURE 5B is a fragmental horizontal section on the same scale as and showing the cover construction and mounting of FIGURE 5A.
Figure 3A:
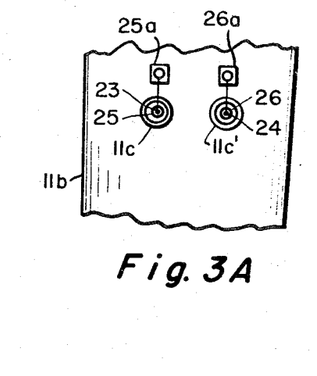
FIGURE 3A is an outside vertical fragment on the scale of FIGURE 2, showing details of electrical high voltage connections disclosed in FIGURE 3.

With particular reference to FIGURES 2 and 3, the transformer 20 is shown as having its core frame or bottom resting on the bottom wall 11a of the pot 11 and as having a conventional coil 21 comprising a high voltage winding and a lower voltage winding. The frame may be secured in a conventional manner (as by bolts) to the side wall 11b and may also be secured to metal columns or posts 28. The concentric windings of the coil 21 have a spaced relation from the bottom of the tank, and the transformer is centrally-located with its windings in a spaced relation with respect to the side wall 11b. A pair of high voltage cables 23 and 24 are shown in which one cable 23 extends through the cone 11c (see FIGURES 3 and 3A) and another cable 24 extends through the adjacent cone 11c'. As customary, the conductor wires of the cables 23 and 24 may be provided with suitable enclosing insulation having wrap-around ground wires or sheathing, designated respectively as 25 and 26 which, as shown particularly in FIGURE 3A, are secured by wire leads and terminals 25a and 26a to the metal of the side wall 11b. Cables 23 and 24 extend through their respective cones and are mounted by terminal lugs 27a and 27b on an insulated terminal block or plate member 27. The openings in the cones 11c and 11c' are suitably sealed-off in a conventional manner by insulated plugs and a sealing resin or cement about the cables 23 and 24 at their point of entry to the chamber A. Insulation is removed from a portion of the cables 23 and 24 within their respective cones to enable a full sealing-off in the sense of preventing fluid seepage through the insulation.

Figure 4:
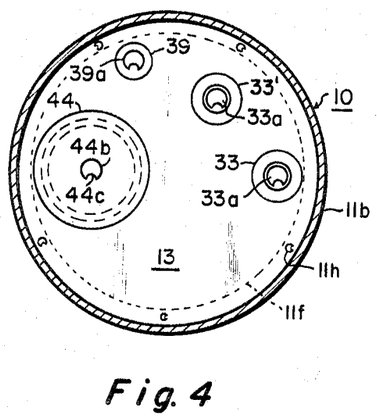
FIGURE 4 is a horizontal section on the same scale as and taken along the line IV—IV of FIGURE 3.
Figure 4A:
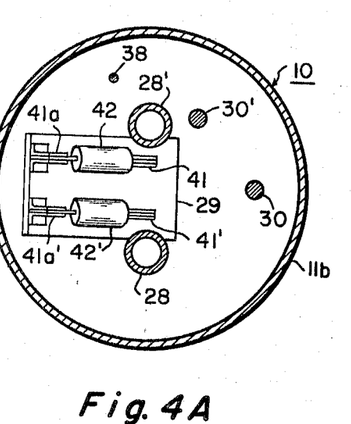
FIGURE 4A is a section on the same scale as FIGURE 4 taken along the line IV-A—IV-A of FIGURE 3.

As shown particularly in FIGURES 3 and 4A, a pair of horizontally spaced-apart upwardly-projecting, centrally-positioned support posts 28 and 28' provide means for supporting the terminal block 27, a fuse block 29 and other equipment.

High voltage leads or cables 23a and 24a extend from the lugs 27a and 27b and are connected to one terminal of an associated bayonet switch 30 or 30'. The switches may each have a fusing element or device, e.g., an operating plunger or rod 31 of insulating material may have a pair of spaced-apart metal contact plug portions that are to be moved into and out of contact with a pair of spaced-apart metal contact sleeves of the switch, with a fuse wire providing the current flow connection between the contact plug portions; U.S. Patent No. 2,918,557 shows a fused disconnect, bayonet type of switch that may be used. Return leads or cables 23b and 24b are connected from the other terminal of each bayonet switch or bayonet switch and fuse to the input of the high voltage winding 21 of the transformer. The high voltage switches may be employed in any suitable circuit, such as in a so-called sectionalizing circuit or in a circuit in which one lead is grounded to the housing. Incidentally, fuses on the high voltage side are employed to protect the system, while those on the low voltage side are employed to protect the transformer from a short circuit.

Figure 3B:
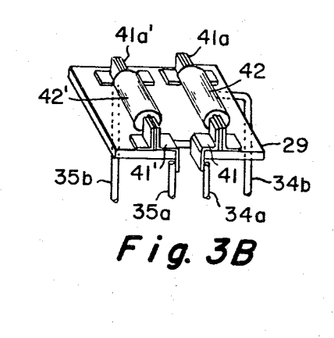
FIGURE 3B is a perspective fragment taken from the inside of the construction of FIGURE 3 and on the same scale as FIGURE 2, showing details of the mounting of fuses disclosed in the unit of FIGURE 3.

Three low voltage leads or cables 34c, 35c and 36 are shown extending through the potting or junction box 11d out of the transformer compartment A. The opening in the box 11d is suitably sealed-off in a conventional manner at the point of exit of the leads or cables 34c, 35c and 36 from the chamber A. Lead 36 is a direct ground lead from the center point of the secondary or lower voltage winding of the coil 21. Leads 34c and 35c from the secondary winding are connected through a thermal circuit breaker 37 and from it through leads 34a and 35a to one associated terminal of a set 41 and 41' on fuse block 29 (see FIGURE 3B). The lead 34a is connected through terminal 41, fuse 42, terminal 41a and lead 34b to a lug terminal 27c on the block 27. Likewise the lead 35a is connected through terminal 41', fuse 42', fuse terminal 41a' and lead 35b to a lug terminal 27d on the block 27. Leads 34c and 35c extend from the lug terminals 27c and 27d out through the box 11d for connection to a suitable domestic or other type of electrical installation. As shown in FIGURE 3, insulation is removed from a portion of these leads within the potting box 11d to assure a full leak-proof seal and prevent the fluid coolant from leaking out through the insulation.

Figure 6:
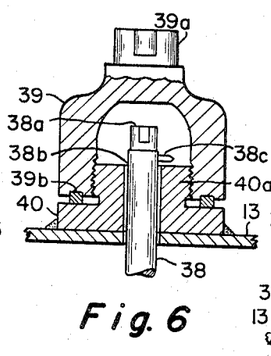
FIGURE 6 is a fragmental section in elevation on a slightly larger scale than FIGURE 5 of a cap assembly for a thermal circuit breaker of the unit of FIGURE 3.
Figure 7:
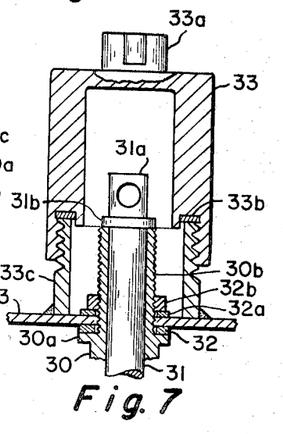
FIGURE 7 is a vertical fragmental section on the scale of FIGURE 6 of a control end of and of a cap for bayonet switches shown in the unit of FIGURE 3.

The thermal circuit breaker 37 is provided with a vertically-extending and electrically-insulated operating rod or shaft 38 which projects up through a hole or opening in the partition member 13 and is provided with a turn-position finger or pointer 38c and an operating head in the form of a wrench flat 38a (see FIGURES 3 and 6). The bayonet switches 30 (and 30') each has a slidable operating rod, shaft or plunger 31 (see FIGURE 7) that extends up through a hole in the partition 13 and that has an operating eyelet head 31a. Since the switches 30 and 30' are of the same construction and mounting, I have only shown the details of the construction of the switch 30 in FIGURE 7.

As shown particularly in FIGURES 4 and 6, the wrench flat 38a may be rotated to close, open or reset the circuit breaker 37, as indicated by a projecting pointer 38c. The rod 38 rotatably extends through a reinforcing plate 40 that is secured, as by weld metal, on the partition member 13; stem portion 38b of the rod 38 is adapted to extend in a spaced relation through a cap mounting collar part 40a that projects upwardly from the plate 40 and may be an integral part thereof or welded thereto. It will be noted that the collar 40a has an outer male threading to removably-receive a closure cap 39. The closure cap 39 has a socket wrench flat or head 39a at its upper end, so that it may be screwed on and off the collar 40a, into and out of sealing-off engagement with an annular washer or gasket 39b which rests on the reinforcing plate 40. It is thus apparent that the cap 39 keeps out dirt and moisture and seals-off the lower chamber A at the joint through which the shaft 38 extends, and that it can be removed by screwing it off the collar 40a, in order that thermal circuit breaker 37 may be operated by applying a spanner wrench (such as shown in FIGURE 9) to its wrench flat or head 38a.

With particular reference to the bayonet switches 30 and 30' (see FIGURES 4 and 7), the housing of each switch extends up adjacent to the partition plate member 13 and each switch operating rod or plunger 31 extends therefrom, through the plate 13 and thereabove. The upper portion of the housing has an annular flange 30a which is adapted to position a lower end of a threaded sleeve portion 30b. The sleeve portion 30b slidably-receives the upwardly-projecting end portion of the switch rod 31 and cooperates with its annular end flange 31b to serve as a stop limit for the "down" position of the rod. A gasket 32, a washer 32a and a nut 32b secure the sleeve portion 30b in a sealed-off relation within the hole in the partition 13. The sleeve portion 30b and the upwardly-projecting end of the rod 31 are enclosed within the upper control or access chamber B by a closure cap 33. A mounting collar 33c is secured, as by welding or brazing, to project upwardly from the partition 13 and has external threads to removably-cooperate with internal threads of the closure cap 33 and a sealing gasket 33b to secure the 33 in a sealed-off position over the opening in the partition 13 and on the collar 33c. The cap 33 may be removed by applying a socket spanner wrench (such as shown in FIGURE 9) to its wrench flat or head portion 33a.

Figure 5:
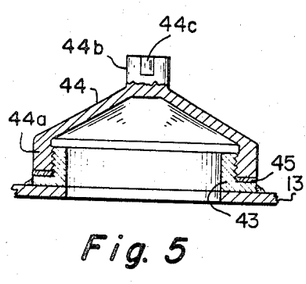
FIGURE 5 is a further enlarged fragmental section, showing details of the construction and mounting of an access cover that is disclosed in FIGURES 3 and 4.

As shown particularly in FIGURES 3, 4 and 5, a maintenance opening is provided in the partition 13 above the fuse block 29 and is closed-off by a cone-shaped cap 44. The cap 44 has an internally-threaded flange wall 44a at its lower end portion which engages complementary threads of an angle-shaped collar 43 which surmounts the opening or maintenance hole in the partition member 13. The collar 43 may be welded or brazed on the partition member 13. It will be noted that a gasket 45 is interposed between the bottom edge of the threaded flange wall 44a and a foot portion of the collar 43. It will thus be apparent that the cap 44 can be screwed into a sealed-off closing relation with the access hole by the use of a spanner socket wrench 47, such as shown in FIGURES 9 and 9A, as applied to its wrench head portion 44b.

For more critical openings, I have shown a spanner wrench 47 provided with a cross handle 47a and a half-moon shaped lug 47c in its socket portion 47b that is adapted to engage a corresponding half-moon shaped slot, such as 44c in, for example, wrench head portion 44b of the cap 44. See also the half-moon slot 18a in the head portion of the bolts 18 of FIGURE 8 which are employed for securing the cover plate 14 in position. The head portions 33a and 39 will preferably be of the same size and construction as the head 44b. The heads of bolts 11h that secure the partition or upper wall member 13 in position and the head 38a are also preferably of the same construction as the head 44b, but may be of smaller size, thus requiring a spanner wrench having a smaller socket. As particularly shown in FIGURE 3, the partition wall or member 13 may rest on an annular flange portion 11f of the side wall 11b. The flange 11f carries a gasket 11g and has spaced-apart threaded bore holes for receiving mounting bolts 11h. It is thus apparent that the member 13 is removably-secured in a fluid-sealed-off relation between chambers A and B. As shown in this figure, the bolts 18 are preferably inset within recesses 14b in the cover member 14, so as to obviate the presenting obstructions along its upper surface. This provides a so-called flush type of mounting for the heads of the bolts 18 and makes them relatively tamper-proof.

In servicing the unit 10, the bolts 18 may be removed by the use of a spanner wrench corresponding to 47 and the lid 14 then lifted-off the top compartment B. At this time, the special type of wrench head portions 33a and 39a and the special type of wrench head 44b are exposed. If, for example, the circuit breaker 37 has been opened, the cap 39 may be removed and it may be reset by turning the head 38a of the control shaft or rod 38. If, on the other hand, one of the bayonet switches 30 and 30' needs to be reset, the cap 33 or 33' may be removed; the switch blade end portion 31a is then exposed. If a fuse 42 or 42' has to be replaced, then the spanner wrench 47 may be used to remove the closure 44. If full servicing of the lower chamber or compartment is desired, the bolts 11h may be removed and the partition 13 lifted-off.

Figure 10:
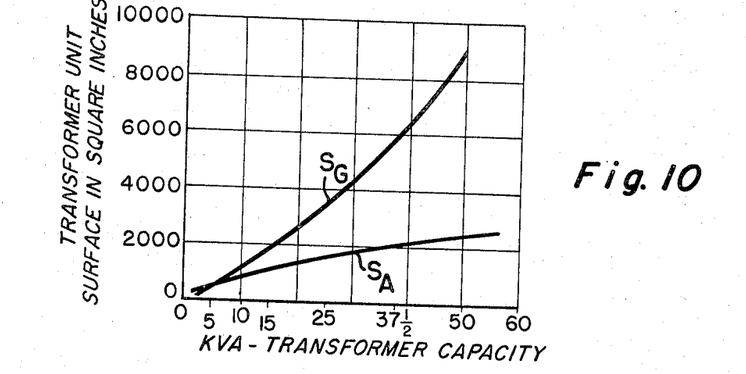

In the chart of FIGURE 10, the curve $S_G$ represents a transformer unit of my construction as employed as a direct burial unit, and the curve $S_A$ represents a conventional buried air-cooled unit. Typical values of surface areas of the units are plotted as functions of kva. (kilavolt amperes). These curves thus show comparatively the minimum surface areas required for the capacity of each transformer to assure adequate heat dissipation under constant load conditions.

Figure 11:
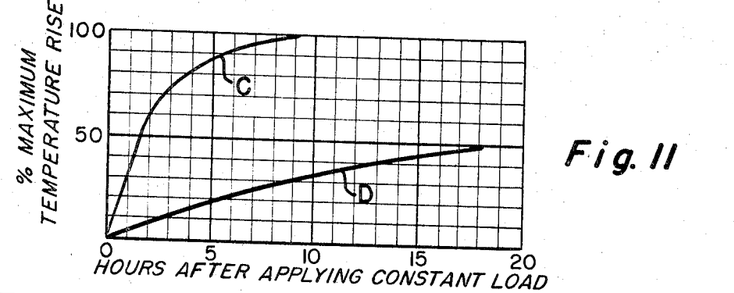

In FIGURE 11, the curve D represents a direct burial unit of my construction and the curve C represents the conventional air-cooled trnsformer unit. This chart shows comparatively the temperature rise characteristics of the transformer units following an application of a constant load. As indicated, the conventional air-cooled transformer (curve C), will attain its maximum temperature rise in about ten hours after the application of the load. On the other hand, as shown by the curve D, a unit of my construction having the same kva. capacity will attain only about 50% of its maximum temperature rise after a constant load has been applied for a length of time twice that of the air-cooled unit. Incidentally, I have determined that I can further extend the time it takes for a transformer of my construction to reach its terminal temperature by increasing its axial length proportionately so as to give it greater elongation and obtain an increased direct, heat dissipating or conduction area about the unit.

Figure 12:
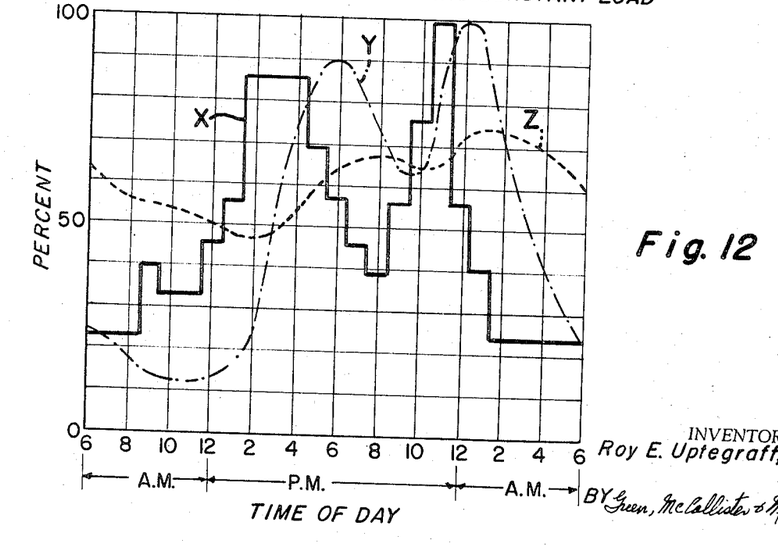

In FIGURE 12, the solid line X represents a percentage of the kva. peak load applied to a transformer unit during a typical twenty-four hour operational period. Broken line Y shows the temperature rise of the conventional air-cooled transformer unit in percent of the maximum and broken line Z represents the temperature rise of the unit of my construction in percentage of the maximum temperature. This graph shows that my buried unit has a thermal time constant about five times as great as the conventional air-cooled unit, and that its maximum temperature is about 25% less following a peak load of a typical daily cycle, as indicated by X. In terms of thermal time characteristics, I have thus found that I may employ a lower capacity unit of my construction, as compared to a conventional air-cooled transformer unit. It is well known that the destructive or aging effect on a transformer increases rapidly with a temperature rise and that a high temperature of short duration can be very damaging in comparison to moderate temperatures of long duration. It will be further noted that a temperature rise in my transformer unit is delayed and peaks at a much lower point than the air-cooled transformer unit.

It will thus be apparent that a transformer unit of my construction has superior thermal qualities as compared to the air-cooled transformer unit. This quality resides in its greater thermal inertia to transient heating. Residential electrical energy consumption varies greatly during a 24 hour cycle, such that peak loads may occur having maximum values many times the average load. Since the peak loading is usually brief, transformers are presently installed with the expectation that they will experience temporary peak loads of two or more times their load ratings. This is a principal criterion for selecting the size for a particular use. The actual peak temperature rise of a transformer depends on the duartion and magnitude of the load and the thermal inertia of the transformer. This thermal inertia is commonly identified as its thermal time constant and indicates the time required for the transformer to attain 63% of its final constant temperature afer a constant load has been applied. A transformer unit of my invention, due to its effective tank or pot wall transfer area and the large heat capacity of the surrounding earth, takes much longer to reach its thermal temperature and will attain a lower temperature on peak loading.

I have also found that a transformer unit of my construction and mounting minimizes peak temperature due to the low and constant ambient temperature of its direct heat transfer earth environment. In contrast, an air-cooled unit is subject to much more variable ambients, including the effect of direct exposure to the sun; vault mounting does not enable it to escape the heat of the sun imparted through an open grill cover or the heat imparted by the sun to the air being circulated. By way of example, the ambient temperature of the underground may be about 15°±5° C., as compared to the ambient temperature of the air of about 15°±30° C.

My self-cooled transformer unit is constructed for underground or subterranean usage and may be employed to reduce distribution or electrical supply line voltages of, for example, 2400 volts and greater to residential or power user line voltages of, for example, 600 volts or less. A transformer for this purpose may employ, as illustrated, a three wire low voltage output. Although a two wire high voltage input is illustrated, a single wire lead with the second lead being proved by a ground connection may be employed. Also, by introducing two or three transformer units, vertically stacked in a common tank or casing, three phase arrangements may be attained. I have determined that the following formula is representative of the ground relationship which exists in the employment of a transformer unit of my invention;

(1) $$S_G = A \frac{Q^2}{K^2 (\Delta T_G)^2}$$

Where:

$S_G$ = effective heat dissipating surface area of unit (lower chamber) to which transformer heat is imparted.
$A$ = a constant depending on the depth of burial and the general geometry of the unit.
$Q$ = heat energy to be dissipated in joules per second, usually proportional to $(k.v.a.)^{3/4}$ and, wherein kva. represents the capacity of the transformer.
$K$ = the thermal conductivity of the ground.
$\Delta T_G$ = the difference in temperature between the maximum allowable average surface temperature of the transformer and the average ambient temperature of the ground about the lower chamber of the unit.

Thus, with given values of A, K and $\Delta T_G$, and where $C_1$ is a proportionality constant, the surface area required is represented by the following equation or formula:

(2) $$S_G = C_1 (kva.)^{3/2}$$

As compared to the above, a conventional air cooled type of transformer unit, as to its surface area, is represented by the following equation or formula:

(3) $$S_A = C_2 (kva.)^{3/4}$$

Where:

$S_A$ = surface area of the unit that is required for adequate cooling.
Kva. = capacity or rating of the transformer in kilovolt amperes.
$C_2$ = a proportionality constant.

I have determined that normally, in a relatively small capacity transformer, the surface area of the casing that is required to house the present day type of transformer, is adequate for direct casing to ground heat dissipation, but that as the kva. of the transformer goes above such a small size or capacity that the factor of surface area becomes critical. See, for example FIGURE 10, where the curves $S_A$ and $S_G$ show comparative requirements for transformers of up to about 55 kva., and the small capacity transformer is represented by the about 5 kva. size at which the curves intersect. From Formulas 2 and 3, it is apparent that requirements for a direct to ground heat transfer unit of my invention varies approximately as the square of the wattage, while the requirement for a conventional connection air-cooled type varies approximately directly as the wattage.

I may avoid the use of a lightning arrester in my unit and instead, provide the windings of the transformer with a slightly above normal BIL (basic impulse insulation level) which need not exceed about two times the standard BIL of a conventional transformer. Specifically a given BIL is the crest magnitude of a voltage wave used to test the insulation of a transformer. The wave, typically, has a saw-tooth shape with the voltage rising from zero to crest in about one and one half microseconds, descending to about half the crest value in about forty microseconds. In a sense, this represents an artificial lightning test. However, if desired, a gas-tight type of arrester may be employed with a normal winding or with a winding of increased BIL.

By way of example, the following tabulation is illustrative of typical dimensions, etc., for a transformer unit of my invention:

TABLE A

| Kva. of Unit | Total Loss, watts | Total Weight, pounds | Gallons Oil | Tank Overall Height, inches | (1) Height of Oil Chamber, inches |
|---|---|---|---|---|---|
| 10 | 185 | 500 | 37 | 46 | 34 |
| 25 | 359 | 850 | 68 | 62 | 50 |
| 50 | 608 | 1,650 | 140 | 76 | 64 |
| 100 | 1,107 | 3,000 | 280 | 104 | 92 |

| Kva. of Unit | (2) Average Dia. of Tank, inches | (3) Oil Depth, inches | Ratio of (1) to (2) | Ratio of (3) to (2) |
|---|---|---|---|---|
| 10 | 18 | 30.6 | 1.89 | 1.70 |
| 25 | 20 | 45 | 2.50 | 2.25 |
| 50 | 25 | 57.6 | 2.56 | 2.30 |
| 100 | 30 | 82.8 | 3.07 | 2.76 |

In the above examples, it will be noted that the height of the upper or air chamber B is about twelve inches. The oil level in the lower or oil chamber A will be about 90% of its depth, for example with reference to the 10 kva. unit, the depth of the oil will be about 30.6 inches and the space thereabove in the lower or oil chamber A will be about 3.4 inches.

Although a transformer unit of my invention, such as represented by the different rated units of Table A, operate at about a 65° to 75° C. mean temperature, I have determined that the mean temperature should be maintained below a safe operating temperature of about 80° C. In accordance with my concept, it is important to avoid any thermal gradient between the interior wall portion and exterior wall portion of the tank and avoid any effective thermal barrier between the wall (exterior) of the tank or casing 11 and the surrounding ground and to provide the tank with a sufficient heat dispersing height for the heat generating capacity of its transformer. In this connection, the minimum ratio of effective height to average diameter for a given size of transformer, where the height is substantially represented by the height or length of chamber A and particularly, by the depth or height of the oil in such chamber, is determined or controlled by Equation 2 above. Employing a transformer unit of my invention, there are no so-called hot spots, with the temperature distribution being substantially uniform through the height of the heat transfer or lower chamber A. As before intimated, it is advantageous to have the chamber A of a sufficient depth such that it extends from its top portion or liquid level along a substantially constant temperature area of the ground, e.g., having most of its area about three feet or more below the ground level.

It will be noted that the posts 28 are of metal and extend from the metal of the core or frame of the transformer 20, upwardly for substantially the full extent of the oil depth in the chamber A. They thus serve as direct heat transfer means centrally of the chamber to impart heat to the convection flow portions $b$ and $b'$ during their central upward movement and thereby increase the efficiency of transfer of heat generated by the transformer to the side wall 11b of the tank or pot 11.

In FIGURES 5A and 5B, I have illustrated a modified form of access cover construction and mounting. As disclosed, the partition or wall member 13 has an upwardly-projecting inwardly-sloped annular shoulder portion 13a that terminates in a radially-inwardly projecting annular, angular flange or rim portion 13b. The flange portion 13b defines the periphery of the opening and also provides a mounting for a sealing gasket 53. A cover member 50 has an upper flat or planar apex portion 50a that is provided with a central hole therethrough; it also has a lower annular, annulus flange or rim portion 50b which projects downwardly and defines a closed, box-like compartment with the angular flange portion 13b of the partition 13 to substantially fully contain the gasket 53. A cross-extending locking member or arm 51 having an inwardly projecting reinforcing flange 51a is adapted to abut against the shelf of the angular-shaped flange portion 13b. A stop angle piece 52 is secured, as by welding, on the flange 51a to project radially outwardly therefrom and abut the underside of the partition wall 13, adjacent the shoulder 13a.

The locking arm 51 has a central opening 51b therethrough within which a cup-shaped housing member 54 is adapted to be securely mounted by means of its upper, channel-shaped, annular flange. The compartment defined by the lower portion of the cup-shaped member 54 carries an internally-threaded grommet 55 for receiving a threaded end or stem portion 56b of a mounting or securing bolt 56. The bolt 56 has a wrench flat, spanner type of head 56a corresponding in construction and shape to the head 44c of the construction of FIGURE 5. A cup-shaped washer 57 is positioned on the stem of the bolt 56 with its annular flange or ring projecting downwardly to position a sealing gasket 58 on the planar portion 50a of the cover member 50. This construction although somewhat more complicated than the construction of FIGURE 5, facilitates the removal of the cover from the standpoint that it utilizes a smaller cooperating threaded area and is thus a preferred construction for a larger size transformer unit.

It will be noted that when the bolt 56 is tightened down, it will, in combination with the face of the portion 50a and the inside of the washer 57, seal-off the area about its stem through the agency of the washer 58 and further, by application of upward force on the locking arm 51, will with the washer 53, seal-off the hole or opening between the partition 13 and cover member 50. After the bolt 56 has been loosened, the arm 51 may be slid to one side to disengage the angle piece 52 from the partition wall 13; then, the arm member 51 and the assembly may be tilted, in order that the arm may be moved out through the opening in the partition wall 13. As an alternative, the hole or opening in the wall 13 may be of rounded elongated shape and the member 51 may be a rounded elongated closure plate (not shown); in such a construction, removal may be accomplished by rotating the member 51 about 45° until the shorter portion of its diameter is aligned with the wider diameter of the hole, and then tilting the member out through the opening or hole in the partition 13.

Certain novel features of my construction, such as the provision of superimposed compartments, with auxiliary equipment disposed in the lower compartment and operative from the upper compartment, the employment of heat conductive central column means, etc., are applicable for providing improvements in conventional transformer units. The invention is particularly applicable to transformers having a power rating within a range of about 25 to 100 kva.

I claim:

1. An improved heat dissipating transformer unit for connection between an electrical power supply line and a power user line which comprises: an elongated heat-conductive tank having closed-off bottom end wall, having an upwardly-projecting enclosing side wall that is continuous about said tank, and having an open top end portion; an upper partition end wall extending across the inside of said tank and secured to said side wall to define a lower heat convection chamber and a superimposed upper control chamber in a sealed-off relation with respect to each other, an electrical transformer positioned within said lower chamber, auxiliary equipment positioned in said lower chamber and electrically connected to said transformer within said lower chamber, high and low voltage electrical leads from said transformer and auxiliary equipment to the outside of said tank for connection to the power supply and user lines, a convection dielectric fluid substantially filling said lower chamber and immersing said transformer and auxiliary equipment, said auxiliary equipment having control means projecting upwardly from said lower chamber through said partition wall into said upper chamber, removable cap means mounted on said partition wall within said upper chamber for sealing-off said lower chamber with respect to said upper chamber about said control means, and a lid removably cooperating with the open top end portion of said tank at the upper end of said upper chamber.

2. An improved transformer unit as defined in claim 1 wherein said cap means has spanner-wrench-operated heads of rounded shape with side slots, and bolts having spanner-wrench-operated heads of rounded shape with side slots are employed to removably-secure said partition wall on said side wall and said lid on the open top end portion of said tank.

3. An improved transformer unit as defined in claim 1 wherein, said transformer is positioned on said bottom end wall, and heat conductive post means extend upwardly from said transformer along said lower chamber.

4. An improved transformer unit as defined in claim 1 wherein said auxiliary equipment includes, circuit breaker and fuse means electrically-connected between a low voltage winding of said transformer and said low voltage leads, and fused disconnect switch means electrically-connected between a high voltage winding of said transformer and said high voltage leads.

5. A direct to ground heat dissipating burial transformer unit for connection between an electrical power supply line and a power user line which comprises, a heat-conductive tank having a closed bottom wall and an upwardly projecting enclosing side wall that is continuous about said tank, a partition wall extending across the inside of said tank and secured to said side wall to define a lower heat convection chamber and an upper control chamber that are sealed-off with respect to each other, an electrical transformer positioned centrally within and adjacent said bottom wall within said lower chamber in a spaced-apart relation with said side wall, auxiliary equipment positioned in said lower chamber above said transformer, electrical connections between said transformer and said auxiliary equipment and in a sealed relation out through said side wall to connect said transformer with the power supply and power user lines, a convection dielectric fluid substantially filling said lower chamber and having a top level in a spaced relation below said partition wall, said convection fluid being adapted to move centrally-upwardly from said transformer to its top level and then downwardly fully along said side wall to convey heat generated by said transformer substantially fully about and along the portion thereof defining said lower chamber below the level of said convection fluid, and said portion of said side wall being adapted to directly conduct heat from said side wall fully thereabout and therealong into abutting ground of a burial hole, said auxiliary equipment having operating means projecting upwardly from said lower chamber through said partition wall into said upper chamber, removable means cooperating with said partition wall for sealing-off said projecting operating means within said upper chamber, means cooperating with said side wall for removably sealing-off said upper chamber with respect to the ambient atmosphere, and said upper chamber having a bottom extent substantially fully defined by said partition wall.

6. A burial transformer unit as defined in claim 5 wherein, said transformer has a frame carrying input and output windings in an upwardly spaced relation with respect to said bottom wall, and said frame rests at its lower end on said bottom wall whereby the convection fluid may move from a bottom end portion of said windings along said bottom wall and upwardly centrally along said windings to transfer heat generated to said bottom wall for direct dispersion from said bottom wall through a base portion of the ground of the burial hole within which said units is buried.

7. A burial transformer unit as defined in claim 5 wherein, said side wall is of generally circular shape and has a slightly increased diameter from said bottom wall upwardly from said lower chamber to the upper end of said upper chamber, and said side wall has a heat transferring capability therealong at least substantially equal to the heat transferring capability of the ground of the burial hole within which it is buried.

8. A direct burial transformer unit as defined in claim 5 wherein said tank has a depthwise to transverse dimension ratio of up to about 10 to 1.

9. A burial transformer unit as defined in claim 5 wherein the effective heat dissipating surface area of said tank at least equals $C_1(kva.)^{3/2}$, where $C_1$ is a proportionality constant and kva. is the kilovolt ampere rating of said transformer.

10. A direct burial transformer unit as defined in claim 5 wherein spaced-apart upright posts are positioned substantially centrally of said lower chamber to extend upwardly from said transformer along the full depth of said convection fluid for directly conducting heat generated by the transformer substantially along the full central extent of said convection fluid.

11. A direct burial transformer unit as defined in claim 10 wherein said auxiliary equipment is mounted on said posts in a spaced-apart relation within said lower chamber to permit movement of the convection fluid within said chamber.

12. A direct burial transformer unit as defined in claim 10 wherein said transformer has a high voltage winding and a lower voltage winding; said auxiliary equipment includes a pair of switches connected to said lower voltage winding, and includes circuit breaker means and fuses connected with said lower voltage winding.

13. A direct burial transformer unit as defined in claim 12 wherein said projecting operating means of said auxiliary equipment include switch plungers for said switches and an operating member for said circuit breaker means; and said removable means for sealing-off said projecting operating means within said upper chamber comprises, threadably-positioned gasketed caps provided with wrench heads for removably securing them in position on said partition wall within said upper chamber, said partition wall has an open portion therein above said fuses, and a removable gasketed cap is secured about said open portion within said upper chamber and is provided with a wrench head for removably sealing-off said open portion and providing access from said upper chamber to said lower chamber.

14. A direct to ground heat dissipating burial transformer unit for connection between an electrical power supply line and a power user line which comprises, a tank of heat conductive material having a lower end closure wall and a fully upwardly-projecting continuously-encircling side wall secured to said lower end wall, an upper closure wall for said side wall and with said side and lower end walls defining a longitudinally upwardly-extending convection chamber within said tank, an electrical transformer mounted on said lower wall substantially centrally of said chamber, said chamber being adapted to be substantially filled by a convection fluid to a top level spaced below said upper closure wall, said chamber defining open spacing along its full extent for upward and downward convection movement of fluid therewithin to transfer heat generated by said transformer fully about and along said side wall for the depth of said fluid, said tank having a ratio of average transverse extent across said chamber with respect to substantially its longitudinal extent from its said lower end wall to its said upper wall sufficient to provide an effective heat dissipating surface area along its outer walls that equal about $C_1(kva.)^{3/2}$, where $C_1$ is a proportionality constant and kva. is the power rating of said transformer.

15. A direct burial transformer unit as defined in claim 14 wherein the side and lower end walls have a heat conductivity at least equal to the conductivity of surrounding ground.

16. A direct burial transformer unit as defined in claim 15 wherein the side and lower end walls are of resin impregnated fiberglass material.

17. A direct burial transformer unit as defined in claim 14 wherein said side and lower walls are of metal material and have a protective coating thereabout that has a conductivity substantially at least equal to the conductivity of surrounding ground within which said tank is to be positioned.

18. A direct burial transformer unit as defined in claim 14 wherein heat conductor means extends centrally-upwardly from said transformer along said chamber for conducting heat from said transformer along the depthwise extent of the convection fluid within said chamber.

19. A direct burial transformer unit as defined in claim 14 wherein, said upper wall is a partition wall spaced from an upper end portion of said side wall, said side wall has a top open end portion spaced upwardly from said partition wall, and a cover member is removably-secured in a sealed-off relation over said top open end portion to said side wall to define an upper superimposed chamber within said tank that is fully within the upper continuation of said side wall and is segregated from said lower chamber by the below-spaced level of said convection fluid with respect to said partition wall and by said partition wall.

20. A direct burial transformer unit as defined in claim 19 wherein, said partition wall has an open portion therein, and an inspection and maintenance closure cap is removably-secured in a sealed-off relation over said open portion within said upper chamber.

21. A direct burial transformer unit as defined in claim 20 wherein, auxiliary equipment, including switches and a circuit breaker are positioned in said lower chamber in a spaced relation with respect to each other in such a manner as to permit convection movement of said fluid within said lower chamber, said circuit breaker has an operating member projecting upwardly through an opening in said partition wall and said switches have plungers projecting upwardly through openings in said partition wall whereby said switches and said circuit breaker may be operated from within said upper chamber, and means within said upper chamber cooperating with said partition wall for removably sealing-off the openings through which said operating member and said plungers extend into said upper chamber.

22. A direct burial transformer unit as defined in claim 21 wherein, said top open end portion is defined by an outwardly-projecting flange about said side wall, bolts removably-secure said cover member on said flange, and said bolts and said closure cap have wrench heads provided with a crescent-shaped slot that require a special wrench having a crescent-shaped projection to remove them.

23. A method of employing an electrical transformer in an underground installation wherein the transformer is enclosed in an elongated heat conductive container defining a sealed-off chamber having a heat dissipating outer surface area at least equal to $C_1(kva.)^{3/2}$, in which $C_1$ is a proportionality constant and kva. is the transformer rating and having a convection fluid substantially filling the chamber and surrounding the transformer, providing a hole in the ground of greater width than the maximum transverse dimension of the container and of a depth sufficient to at least fully receive the container below the surface level of the ground, placing the container in the hole with its chamber positioned within a substantially constant temperature level of the ground and with its bottom wall resting on the ground at the bottom of the hole and with its sides spaced in an opposed relation with the sides of the hole, filling and tamping ground dirt down into the spacing between the side wall of the container and the hole until the side wall is in a subterranean heat conducting relation therealong and thereabout with the ground, applying an electrical load to the transformer and circulating the convection fluid within the chamber substantially centrally-upwardly therein from the transformer and then downwardly along the inside of the side wall to impart heat generated by the transformer to and along the side wall of the chamber, maintaining the inside and the outside of the side wall at substantially the same temperature, and effectively conducting heat imparted to the inside of the side wall substantially directly from the outside thereof into and through the surrounding ground while maintaining the chamber at a substantially uniform temperature within a maximum mean of about 80° C.

References Cited

UNITED STATES PATENTS

| | | | |
|---|---|---|---|
| 2,735,040 | 2/1956 | Opsahl | 317—15 X |
| 2,988,679 | 6/1961 | Dazzi | 317—15 X |
| 3,014,158 | 12/1961 | Nelson et al. | 317—15 |
| 3,210,750 | 10/1965 | Leonard | 317—15 X |
| 3,271,710 | 9/1966 | Leonard | 174—16 X |

JOHN F. COUCH, *Primary Examiner.*

J. D. TRAMMELL, *Assistant Examiner.*

U.S. Cl X.R.

174—15; 336—58, 94